US009200917B2

(12) United States Patent
Ogawa (10) Patent No.: US 9,200,917 B2
(45) Date of Patent: Dec. 1, 2015

(54) VEHICLE CONTROL DEVICE

(75) Inventor: Yuki Ogawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/383,352

(22) PCT Filed: Mar. 8, 2012

(86) PCT No.: PCT/JP2012/056035
§ 371 (c)(1),
(2), (4) Date: Sep. 5, 2014

(87) PCT Pub. No.: WO2013/132640
PCT Pub. Date: Sep. 12, 2013

(65) Prior Publication Data
US 2015/0066271 A1    Mar. 5, 2015

(51) Int. Cl.
*G01C 21/36*    (2006.01)
*B60L 7/14*    (2006.01)
(Continued)

(52) U.S. Cl.
CPC . *G01C 21/36* (2013.01); *B60L 3/00* (2013.01); *B60L 7/14* (2013.01); *B60L 11/14* (2013.01); *B60L 11/18* (2013.01); *B60L 11/1816* (2013.01); *B60L 15/2009* (2013.01); *B60W 20/00* (2013.01); *G01C 21/34* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/622* (2013.01); *B60L 2240/642* (2013.01); *B60L 2240/645* (2013.01); *B60L 2240/72* (2013.01); *B60L 2250/16* (2013.01); *B60L 2250/26* (2013.01);
(Continued)

(58) Field of Classification Search
CPC .... G01C 21/26; G01C 21/36; G01C 21/3469; B60L 3/00; B60L 11/18; B60L 7/14; B60W 40/13
USPC .................. 701/22, 527, 123, 300; 180/65.21
See application file for complete search history.

(56) References Cited

U.S. PATENT DOCUMENTS

| | | | |
|---|---|---|---|
| 2009/0326750 A1 | 12/2009 | Ang | |
| 2013/0131900 A1* | 5/2013 | Yu et al. | ........................... 701/22 |
| 2014/0097673 A1* | 4/2014 | Papajewski et al. | ........... 307/9.1 |

FOREIGN PATENT DOCUMENTS

| | | |
|---|---|---|
| JP | 2003 9310 | 1/2003 |
| JP | 2009 12605 | 1/2009 |

(Continued)

OTHER PUBLICATIONS

International Search Report Issued May 29, 2012 in PCT/JP12/056035 Filed Mar. 8, 2012.

*Primary Examiner* — Tan Q Nguyen
(74) *Attorney, Agent, or Firm* — Oblon, McClelland, Maier & Neustadt, L.L.P.

(57) ABSTRACT

A vehicle control device that controls a vehicle, including a route detecting unit configured to detect a route to a destination, a travel load calculating unit configured to calculate travel load information of the route, and a travel plan calculating unit configured to calculate a travel plan including a drive mode of each section of the route based on the route and the travel load information of the route, wherein the travel load calculating unit changes a level of detail of the section which is used for calculating the travel load information according to a distance from a present location to the destination.

20 Claims, 5 Drawing Sheets

(51) Int. Cl.
*B60L 11/14* (2006.01)
*B60L 11/18* (2006.01)
*B60L 15/20* (2006.01)
*G01C 21/34* (2006.01)
*B60L 3/00* (2006.01)
*B60W 20/00* (2006.01)

(52) U.S. Cl.
CPC .......... *B60L2260/52* (2013.01); *B60L 2260/54* (2013.01); *Y02T 10/642* (2013.01); *Y02T 10/70* (2013.01); *Y02T 10/7005* (2013.01); *Y02T 10/7077* (2013.01); *Y02T 10/7241* (2013.01); *Y02T 10/7275* (2013.01); *Y02T 10/7291* (2013.01); *Y02T 90/127* (2013.01); *Y02T 90/14* (2013.01); *Y02T 90/16* (2013.01); *Y02T 90/161* (2013.01); *Y02T 90/162* (2013.01); *Y02T 90/163* (2013.01)

(56) References Cited

FOREIGN PATENT DOCUMENTS

JP        2011 20571       2/2011
WO      2008 038466     4/2008

* cited by examiner

VEHICLE CONTROL DEVICE

FIELD

The present invention relates to a vehicle control device.

BACKGROUND

Recently, a vehicle such as an automobile includes a so-called hybrid vehicle provided with both an internal-combustion engine (engine) which burns fuel and a motor (motor generator) driven by electric power as power sources. Some of such vehicles provided with a plurality of power sources are provided with a control device which controls switching among travel by using the engine as the power source, travel by using the motor generator as the power source, and travel by using both the engine and the motor generator as the power sources. For example, Patent Literature 1 discloses a control device of a hybrid vehicle including an engine and a motor generator as drive sources and a drive wheel in a drive system provided with a battery, information obtaining means, driving schedule setting means, and drive controlling means. When it is not possible to run through a low-load section by travel control in an electric vehicle mode with a charge amount of a battery, the drive controlling means of the control device performs engine intermittent travel control in which a travel power generating mode and an electric vehicle mode are repeated in addition to the travel control in the electric vehicle mode in the low-load section.

Patent Literature 2 discloses a control device of a vehicle including a plurality of travel modes (drive modes). The control device includes means for detecting travel information of the vehicle affected by preference of a driver, storage means for storing the travel information for each category classified at least based on road information, means for updating the detected travel information to store in the storage means, means for searching a travel route to a destination, means for specifying the road information in the searched travel route, means for specifying the category corresponding to the searched travel route, means for reading the travel information in the specified category from the storage means, predicting means for predicting energy balance in the searched travel route based on the read travel information, setting means for setting a travel mode in the searched travel route based on the predicted energy balance, and means for controlling the vehicle so as to travel in the set travel mode.

CITATION LIST

Patent Literature

Patent Literature 1: Japanese Patent Application Laid-open No. 2011-20571
Patent Literature 2: Japanese Patent Application Laid-open No. 2009-12605

SUMMARY

Technical Problem

The device disclosed in Patent Literature 1 can improve fuel economy. The device disclosed in Patent Literature 2 can travel in the travel mode (drive mode) satisfying the preference of the driver. Herein, the vehicle control device which controls the drive mode of the vehicle can improve accuracy in calculation of the drive mode by increasing a process amount of the information. However, as the process amount of the information increases, a load on a calculation function increases, so that it takes time to calculate.

An object of the present invention is to provide the vehicle control device capable of more rapidly controlling the travel of the vehicle.

Solution to Problem

A vehicle control device according to the present invention that controls a vehicle, includes a route detecting unit configured to detect a route to a destination; a travel load calculating unit configured to calculate travel load information of the route; and a travel plan calculating unit configured to calculate a travel plan including a drive mode of each section of the route based on the route and the travel load information of the route, wherein the travel load calculating unit changes a level of detail of the section which is used for calculating the travel load information according to a distance from a present location to the destination.

Further, it is preferable that at the time the distance from the present location to the destination is longer than a threshold distance, the travel load calculating unit calculates the travel load information of at least a partial section with a level of detail coarser than the level of detail in a case where the distance from the present location to the destination is shorter than the threshold distance.

Further, it is preferable that at the time the distance from the present location to the destination is longer than the threshold distance, the travel load calculating unit makes a level of detail of an intermediate section coarser than a level of detail of a section in the vicinity of the present location and in the vicinity of the destination.

Further, it is preferable that at the time the distance from the present location to the destination is longer than the threshold distance, the travel load calculating unit calculates the travel load information of at least a partial section with the level of detail coarser than the level of detail in a case where the distance from the present location to the destination is shorter than the threshold distance, the travel load calculating unit then calculates the travel load information of the at least partial section with a finer level of detail, and at the time the travel load information is updated, the travel plan calculating unit updates the travel plan based on the updated travel load information.

Further, it is preferable to further include a travel assistance unit configured to notify a driver of the travel plan calculated by the travel plan calculating unit.

Further, it is preferable that the vehicle is a hybrid vehicle provided with a motor generator and an internal-combustion engine, and the travel plan calculating unit is capable of selecting, as the drive mode, an EV mode to travel by using the motor generator as a drive source and a hybrid travel mode to travel by using the motor generator and the internal-combustion engine as drive sources.

Further, it is preferable that the travel plan calculating unit calculates the travel plan with a condition in which the EV mode tends to be selected, at the time the travel load information with the level of detail coarser than the level of detail in a case where the distance from the present location to the destination is shorter than the threshold distance is included.

Further, it is preferable that at the time the distance from the present location to the destination is longer than a set distance, the travel load calculating unit calculates the travel load information to an intermediate point on the route to the destination.

Further, it is preferable that the vehicle is the hybrid vehicle provided with the motor generator and the internal-combustion engine, the travel plan calculating unit is capable of selecting, as the drive mode, the EV mode to travel by using the motor generator as the drive source and the hybrid travel mode to travel by using the motor generator and the internal-combustion engine as the drive sources, and at the time the section in which the travel load information is calculated is to the intermediate point on the route to the destination, a target SOC at the time of arrival at the intermediate point is set to a high value.

Further, it is preferable that at the time the level of detail is coarse, the travel load calculating unit makes a distance of the section longer than a distance in a case where the level of detail is fine.

Advantageous Effects of Invention

The vehicle control device according to the present invention has an effect of rapidly controlling the travel of the vehicle by changing the level of detail with which the travel load is calculated according to the distance to the destination.

DESCRIPTION OF EMBODIMENTS

A vehicle control device according to an embodiment of the present invention is hereinafter described in detail with reference to the drawings. Meanwhile, the present invention is not limited by the embodiment. Components in the following embodiment include a component easily conceived of by one skilled in the art or a substantially identical component.

[Embodiment]

Figure 1:
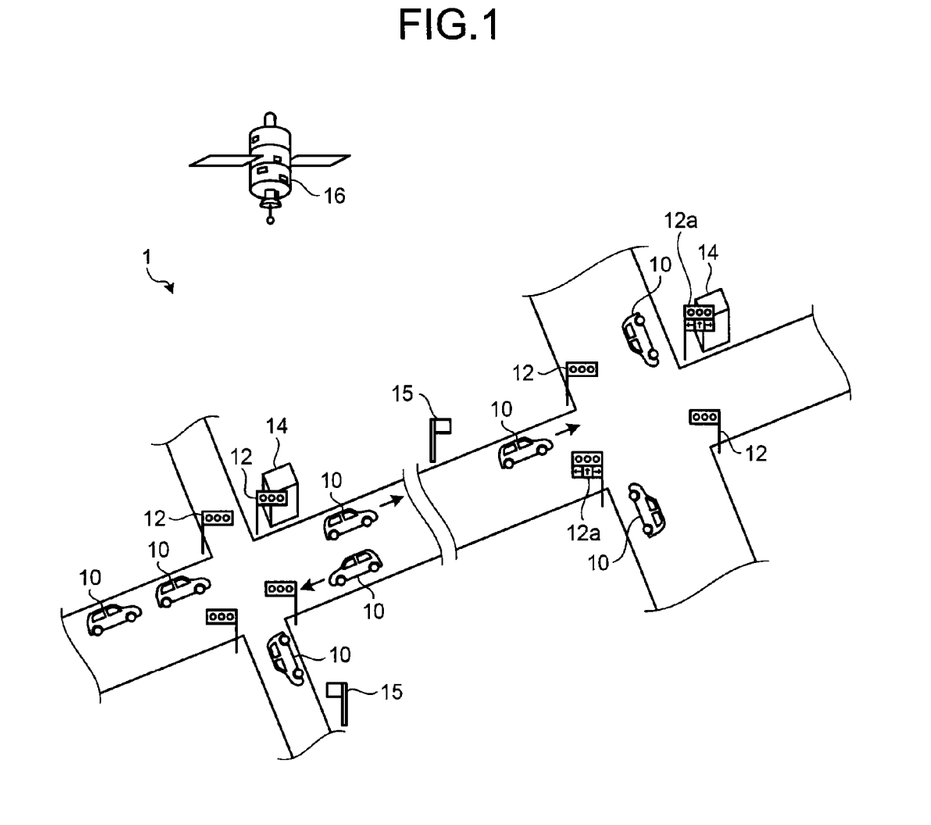
FIG. 1 is an explanatory diagram of an example of a drive control system of this embodiment.
Figure 2:
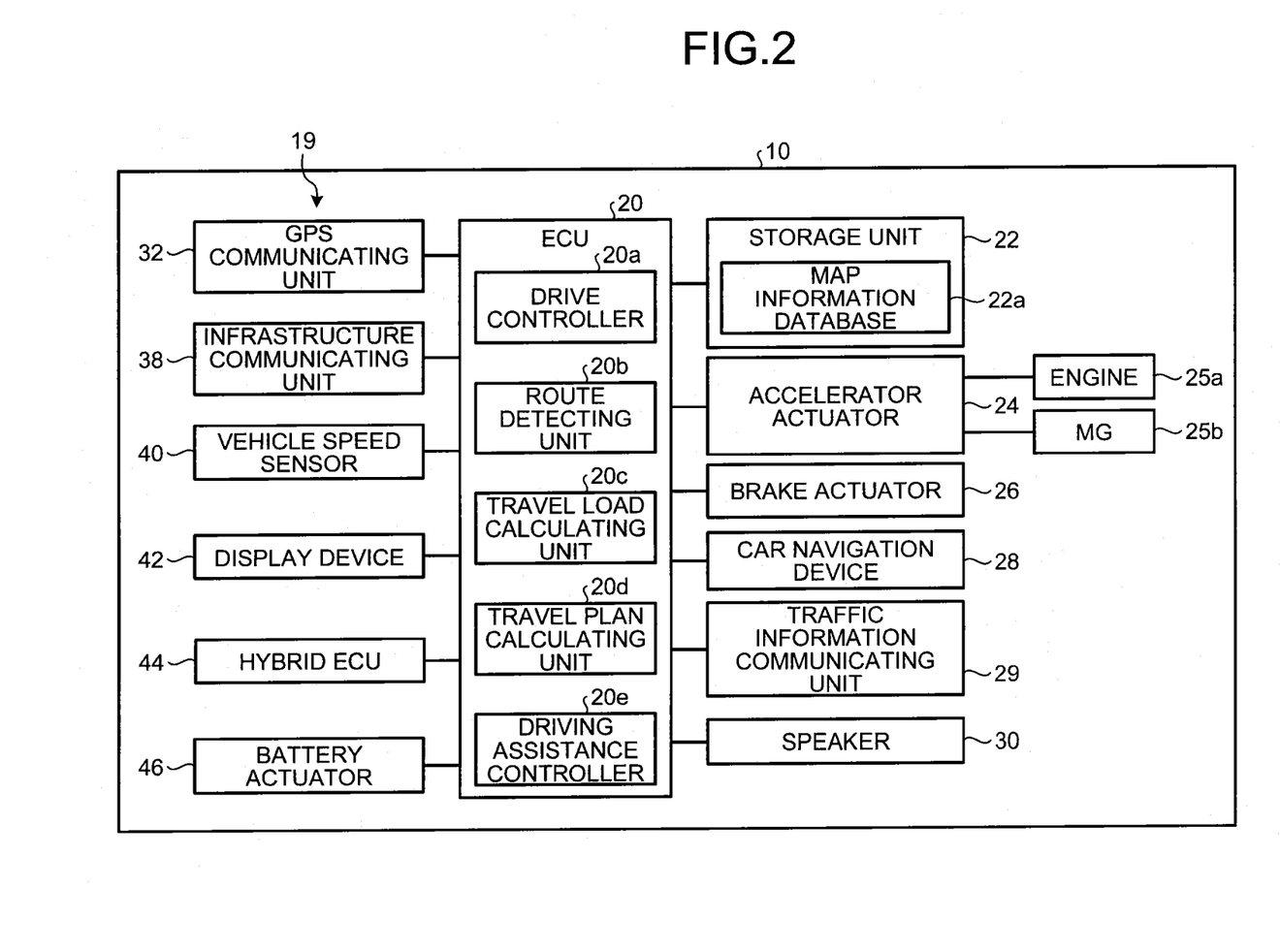
FIG. 2 is a block diagram of a schematic configuration of a vehicle equipped with a vehicle control device according to the embodiment.

An embodiment is described with reference to FIGS. 1 to 6. This embodiment relates to a driving control system including a vehicle equipped with a vehicle control device. A configuration of the driving control system including the vehicle equipped with the vehicle control device is first described with reference to FIGS. 1 and 2. FIG. 1 is an explanatory diagram of an example of the driving control system of this embodiment. FIG. 2 is a block diagram of schematic configuration of the vehicle equipped with the vehicle control device according to the embodiment.

A driving control system 1 illustrated in FIG. 1 includes a plurality of vehicles 10, a plurality of traffic lights 12 and 12a, a plurality of infrastructure information transmitting devices 14, a plurality of traffic information communication base stations 15, and a GPS satellite 16. The driving control system 1 is a system in which the vehicle 10 equipped with a vehicle control device 19 to be described later out of a plurality of vehicles 10 calculates a travel plan based on information obtained by communication with the infrastructure information transmitting device 14, the traffic information communication base station 15, and the GPS satellite 16, and assists driving based on the calculated travel plan.

The vehicle 10 is the vehicle capable of traveling on a road such as an automobile and an auto truck. The vehicle 10 can travel on the road on which the traffic lights 12 and 12a are arranged. A configuration of the vehicle 10 is described later.

The traffic lights 12 and 12a are lighting systems arranged at an intersection. The traffic light 12 is provided with lighting units of three colors: green, yellow, and red. The traffic light 12a is provided with a lighting unit displaying an arrow (arrow light) in addition to the lighting units of the three colors of green, yellow, and red. The traffic lights 12 and 12a are arranged in each of travel directions of the vehicles on the road. The traffic light 12 indicates whether it is in a state in which the vehicle 10 may pass or it is in a state in which the vehicle 10 cannot pass, that is to say, this should stop in the travel direction of the vehicle 10 on the road by switching the lighting unit which emits light out of the lighting units of the three colors of green, yellow, and red. Meanwhile, although a case in which the traffic lights 12 and 12a are arranged at the intersection of the driving control system 1 is illustrated in FIG. 1, arranging positions of the traffic lights 12 and 12a are not limited to the intersection. The traffic lights 12 and 12a may also be arranged at crosswalks, for example.

The infrastructure information transmitting device 14 transmits infrastructure information such as road information of the road on which the vehicle 10 travels and traffic light information related to the traffic lights 12 and 12 in front of the vehicle 10 in the travel direction. The infrastructure information transmitting device 14 of this embodiment is arranged at each intersection and transmits the infrastructure information to the vehicle 10 traveling within a certain range around the same by wireless communication. Herein, the road information typically includes limiting speed information of the road on which the vehicle 10 travels, stop line position information of the intersection and the like. The traffic light information typically includes traffic light cycle information such as a lighting cycle of green light, yellow light, and red light and traffic light change timing of the traffic lights 12 and 12a. Meanwhile, the infrastructure information transmitting device 14 may be arranged for each of the traffic lights 12 and 12a or one infrastructure information transmitting device may be arranged for a plurality of intersections.

The traffic information communication base station 15 is a so-called ITS (intelligent transport systems) spot, a roadside device, which outputs road traffic information of the road on which the vehicle 10 travels. In the traffic information communication base station 15, the road traffic information typically includes traffic jam information of the road, construction information of the road, and traffic lane closure information. The traffic information communication base station 15 outputs the road traffic information of a wide area, for example, an area of approximately 1,000 km to the vehicle 10. The traffic information communication base station 15 can communicate with a road traffic information center which summarizes the road traffic information wirelessly or by wire, can obtain real-time (latest) road traffic information of the wide area by obtaining the road traffic information summarized by a road traffic information management center, and can output the obtained real-time road traffic information to the vehicle 10.

The GPS satellite 16 is a satellite which outputs a GPS signal necessary for detecting a position by a GPS (global positioning system). Although only one GPS satellite 16 is illustrated in FIG. 1, the driving control system 1 is provided with at least three GPS satellites 16. A device which detects the position by the GPS receives the GPS signals output from at least three GPS satellites 16 and compares the received GPS signals with each other to detect its own position.

Next, the vehicle 10 equipped with the vehicle control device 19 is described with reference to FIG. 2. Meanwhile, although all the vehicles 10 are equipped with the vehicle control device 19 in the driving control system 1 illustrated in FIG. 1, it may be configured such that at least one vehicle 10 is equipped with the vehicle control device 19. That is to say, in the driving control system 1, the vehicle without the vehicle control device 19 may travel in front of or behind the vehicle 10 equipped with the vehicle control device 19.

The vehicle 10 includes an ECU 20, a storage unit 22, an accelerator actuator 24, an engine 25a, a motor generator (MG) 25b, a brake actuator 26, a car navigation device 28, a traffic information communicating unit 29, a speaker 30, a GPS communicating unit 32, an infrastructure communicating unit 38, a vehicle speed sensor 40, a display device 42, a hybrid ECU 44, and a battery actuator 46. Meanwhile, the ECU 20, the storage unit 22, the accelerator actuator 24, the brake actuator 26, the car navigation device 28, the traffic information communicating unit 29, the speaker 30, the GPS communicating unit 32, the infrastructure communicating unit 38, the vehicle speed sensor 40, the display device 42, the hybrid ECU 44, and the battery actuator 46 of the vehicle 10 may also serve as the vehicle control device 19 of the vehicle 10. The vehicle 10 is provided with each unit generally included in the vehicle: a vehicle body, a brake device, an operating unit (a steering wheel, an accelerator pedal, and a brake pedal, for example), a battery and the like in addition to the above-described units.

The ECU 20 is an electronic control unit which controls each unit of the vehicle 10: the accelerator actuator 24, the brake actuator 26, the car navigation device 28, the speaker 30, the GPS communicating unit 32, the infrastructure communicating unit 38, the vehicle speed sensor 40, the display device 42 and the like. The ECU 20 controls operation of each unit based on information obtained by the GPS communicating unit 32, the infrastructure communicating unit 38, and the vehicle speed sensor 40 and operation by a driver and the like input from various operating units such as the accelerator pedal and the brake pedal not illustrated. The ECU 20 also includes a drive controller 20a, a route detecting unit 20b, a travel load calculating unit 20c, a travel plan calculating unit 20d, and a driving assistance controller 20e. The drive controller 20a, the route detecting unit 20b, the travel load calculating unit 20c, the travel plan calculating unit 20d, and the driving assistance controller 20e are described later.

The storage unit 22 is a storage device such as a memory in which a condition and data necessary for various processes by the ECU 20 and various programs executed by the ECU 20 are stored. The storage unit 22 stores a map information database 22a. The map information database 22a stores information necessary for the travel of the vehicle 10 (map, straight road, curve, upward/downward slope, express way, sag, tunnel and the like). The map information database 22a is provided with a map data file, an intersection data file, a node data file, and a road data file. The ECU 20 reads the necessary information with reference to the map information database 22a.

The accelerator actuator 24 is configured to control an output of a power source of the vehicle 10 such as the engine 25a and the MG 25b. The accelerator actuator 24 can control an intake volume to the engine 25a, intake timing and ignition timing, and a voltage value, a frequency and the like supplied by the MG 25b, for example. The accelerator actuator 24 is electrically connected to the ECU 20 and the operation thereof is controlled by the ECU 20. The ECU 20 operates the accelerator actuator 24 according to an accelerator control signal to adjust the intake volume to the engine 25a, the intake timing and the ignition timing, and the voltage value and the frequency supplied by the MG 25b. In other words, the accelerator actuator 24 is a device for automatically controlling drive force by the power source which controls a drive condition by receiving the accelerator control signal output from the ECU 20 to drive each unit, thereby generating desired drive force. In this manner, the accelerator actuator 24 adjusts acceleration by controlling the drive force acting on the vehicle 10.

The engine 25a is configured to allow the drive force to act on the wheel of the vehicle 10 according to acceleration request operation by the driver, for example, step operation of the accelerator pedal. The engine 25a generates engine torque as engine torque by consuming fuel as power for travel acting on the drive wheel of the vehicle 10. The engine 25a is a thermal engine which outputs thermal energy generated by combustion of the fuel in a form of mechanical energy such as torque including a gasoline engine, a diesel engine, an LPG engine and the like as an example. The engine 25a is provided with a fuel injection device, an ignition device, a throttle valve device and the like, for example, and the devices are electrically connected to the accelerator actuator 24 to be controlled by the accelerator actuator 24. Output torque of the engine 25a is controlled by the accelerator actuator 24. Meanwhile, the power generated by the engine 25a may also be used for generating electric power by the MG 25b.

The MG 25b is configured to allow the drive force to act on the wheel of the vehicle 10 according to the acceleration request operation by the driver, for example, the step operation of the accelerator pedal. The MG 25b converts electric energy to mechanical power to generate motor torque as the power for travel acting on the drive wheel of the vehicle 10. The MG 25b is a so-called electrical rotating machine provided with a stator being a stator and a rotor being a rotor. The MG 25b is an electric motor which converts the electric energy to the mechanical power to output and at the same time a power generator which converts the mechanical power to the electric energy to recover. That is to say, the MG 25b has both a function as the electric motor driven by electric power supply and converts the electric energy to the mechanical energy to output (power running function) and a function as the power generator which converts the mechanical energy to the electric energy (regeneration function). The MG 25b is electrically connected to the accelerator actuator 24 through an inverter and the like which converts direct electric current and alternating electric current to each other to be controlled by the accelerator actuator 24. Output torque and a power generation amount of the MG 25b are controlled by the accelerator actuator 24 through the inverter.

The brake actuator 26 is configured to control drive of the brake device mounted on the vehicle 10. The brake actuator 26 controls a hydraulic pressure of a wheel cylinder provided on the brake device, for example. The brake actuator 26 is electrically connected to the ECU 20 and the operation thereof is controlled by the ECU 20. The ECU 20 operates the brake actuator 26 according to a brake control signal to adjust a brake hydraulic pressure of the wheel cylinder. In other words, the brake actuator 26 is a device for automatically controlling braking force by a brake which controls the brake hydraulic pressure by driving a solenoid, a motor and the like of a mechanism which supplies operating oil to the wheel cylinder by receiving the brake control signal output from the ECU 20, thereby generating desired braking force. In this manner, the brake actuator 26 controls the braking force acting on the vehicle 10 to adjust deceleration.

The car navigation device 28 is a device which guides the vehicle 10 to a predetermined destination. The car navigation device 28 can bi-directionally communicate with the ECU 20.

The car navigation device 28 is provided with a display unit and displays map information of surroundings on the display unit based on the information stored in the map information database 22a and information of a present location (present position) obtained by the GPS communicating unit 32 to be described later. The car navigation device 28 detects a route to the destination from the information stored in the map information database 22a, the information of the present location obtained by the GPS communicating unit 32 to be described later, and information of the destination (destination position) input by the driver and the like and displays detected route information on the display unit. Meanwhile, the car navigation device 28 may also be provided with its own map information database and GPS communicating unit separately from the map information database 22a and the GPS communicating unit 32 to guide the route and provide notification of the present location information by using its own unit.

The traffic information communicating unit 29 is configured to wirelessly communicate with the above-described traffic information communication base station 15. The traffic information communicating unit 29 obtains the road traffic information transmitted from the traffic information communication base station 15 and transmits the obtained road traffic information to the ECU 20. The traffic information communicating unit 29 may always communicate with the traffic information communication base station 15 with which this may communicate to obtain the road traffic information or may communicate with the traffic information communication base station 15 at regular time intervals to obtain the road traffic information.

The speaker 30 is configured to output voice inside the vehicle 10. The speaker 30 outputs the voice corresponding to a voice signal transmitted from the ECU 20 inside the vehicle.

The GPS communicating unit 32 is configured to receive the GPS signals output from a plurality of GPS satellites 16. The GPS communicating unit 32 transmits the received GPS signals to the ECU 20. The ECU 20 detects its own positional information by analyzing a plurality of received GPS signals.

The infrastructure communicating unit 38 is configured to wirelessly communicate with the above-described infrastructure information transmitting device 14. The infrastructure communicating unit 38 obtains the infrastructure information transmitted from the infrastructure information transmitting device 14 and transmits the obtained infrastructure information to the ECU 20. The infrastructure communicating unit 38 may always communicate with the infrastructure information transmitting device 14 with which this may communicate to obtain the infrastructure information, communicate with the infrastructure information transmitting device 14 at regular time intervals to obtain the infrastructure information, or communicate with a new infrastructure information transmitting device 14 when it becomes possible to communicate with this infrastructure information transmitting device 14 to obtain the infrastructure information.

The vehicle speed sensor 40 is configured to detect a vehicle speed of the vehicle 10. The vehicle speed sensor 40 transmits information of the obtained vehicle speed to the ECU 20.

The display device 42 is a display device which displays various types of information which the driver is notified of and an instrument panel arranged on a dashboard of the vehicle 10, for example. The display device 42 may be a liquid crystal display device or a display device in which various indicators are arranged. The display device 42 displays information of a remaining fuel level, the output of the power source (engine speed), an open/close state of a door, a safety belt wearing status and the like. The display device 42 is provided with a speed display area in which the vehicle speed is displayed.

The hybrid ECU 44 is configured to control the power source controlled by the accelerator actuator 24 according to a drive mode of the power source. Herein, at least an engine travel mode in which the drive force is generated on the drive wheel only by the output of the engine 25a, an EV travel mode in which the drive force is generated on the drive wheel only by the output of the MG 25b as the motor, and a hybrid travel mode in which the drive force is generated on the drive wheel by the outputs of both the engine 25a and the MG 25b are set as the drive modes of the power source in the hybrid ECU 44. The hybrid ECU 44 switches the drive mode based on information of a drive request of the driver, a state of charge of the battery, and a vehicle travel state. The hybrid ECU 44 determines the drive mode switchable by each based on the travel plan set by the travel plan calculating unit 20d and control of the driving assistance controller 20e, the units to be described later of the ECU 20. There is a state in which the hybrid ECU 44 may select only one drive mode based on the travel plan and a state of the control of the driving assistance controller 20e. In this case, the hybrid ECU 44 makes the drive mode the same drive mode regardless of the drive request, the state of charge of the battery, and the vehicle travel state.

When the hybrid ECU 44 selects the engine travel mode, this transmits a control instruction to the accelerator actuator 24 so as to generate requested drive force according to the drive request of the driver in principle only by the engine torque of the engine 25a. When the hybrid ECU 44 selects the EV travel mode, this transmits the control instruction to the accelerator actuator 24 so as to generate the requested drive force according to the drive request of the driver in principle only by the motor torque of the MG 25b. When the hybrid ECU 44 selects the hybrid travel mode, this transmits the control instruction to the accelerator actuator 24 so as to generate the requested drive force according to the drive request of the driver in principle by the engine torque of the engine 25a and the output of the MG 25b as the motor or the generator.

The battery actuator 46 is configured to control the battery mounted on the vehicle. The battery actuator 46 controls an amount of charge and an amount of discharge of the battery based on a charge/discharge map set in advance. The battery actuator 46 detects the SOC (state of charge) of the battery and transmits a detection result to the ECU 20.

Next, control executed by the drive controller 20a, the route detecting unit 20b, the travel load calculating unit 20c, the travel plan calculating unit 20d, and the driving assistance controller 20e of the ECU 20 is described. The drive controller 20a controls the operation of each unit related to drive of the vehicle 10 such as the accelerator actuator 24, the brake actuator 26, and the hybrid ECU 44. The drive controller 20a controls the operation of each unit related to the drive of the vehicle 10 based on the drive request of the driver, a brake request of the driver, a detection result of the vehicle speed sensor 40 and the like, thereby controlling the drive of the vehicle 10. The drive controller 20a outputs the information obtained from each unit connected to the ECU 20 to the accelerator actuator 24, the brake actuator 26, and the hybrid ECU 44.

The route detecting unit 20b bi-directionally communicates with the car navigation device 28 and detects a travel route to the destination of the vehicle 10. The route detecting unit 20b outputs the information of the map information database 22a, the road traffic information obtained by the traffic information communicating unit 29, the information of the present location obtained by the GPS communicating unit 32 and the like to the car navigation device 28 and obtains the information of the route calculated by the car navigation device 28. Meanwhile, the route detecting unit 20b may also detect the route without using a calculation result of the car navigation device 28. That is to say, the route detecting unit 20b may also detect the travel route to the destination by a process other than that of the car navigation device 28.

The travel load calculating unit 20c calculates a load generated when traveling the route detected by the route detecting unit 20b by calculation. The travel load calculating unit 20c calculates power (travel power) necessary for traveling the route based on an inclination of the travel route, necessary time, a limiting speed and the like. The travel load calculating unit 20c calculates fuel and electric power required for traveling the route based on the calculated power and calculates the same as travel load information. The travel load calculating unit 20c performs regeneration by the MG 25b when traveling the route, calculates the electric power which may be charged when the electric power may be charged and calculates the same as a part of the travel load. Meanwhile, the electric power which may be charged may be subtracted from consumed power. That is to say, the travel load calculating unit 20c calculates the travel load as a smaller value when there is the electric power which may be charged. Meanwhile, the travel load information is not limited to consumed energy, a fuel economy, and the travel power and may also include the vehicle speed, the inclination, the required time and the like.

The travel plan calculating unit 20d creates the travel plan by calculation based on the travel route detected by the route detecting unit 20b and the travel load calculated by the travel load calculating unit 20c. Specifically, the travel plan calculating unit 20d determines the drive mode when traveling in each position of the travel route based on the travel route and the travel load and makes relationship between the determined drive mode and the position of the travel route the travel plan.

The driving assistance controller 20e controls the drive mode based on the travel plan calculated by the travel plan calculating unit 20d, thereby assisting the driving of the driver. Specifically, the driving assistance controller 20e controls the operation of the drive controller 20a, the accelerator actuator 24, and the hybrid ECU 44 such that the vehicle 10 is driven by the determined drive mode. Meanwhile, the driving assistance controller 20e may also execute various types of driving assistance other than the drive mode based on the travel plan. The driving assistance includes control to assist the driving of the driver based on relationship between the traffic light cycle information received through the infrastructure communicating unit 38 and the present location, for example. In this case, the driving assistance controller 20e executes operation to display a speed at which it is possible to pass without stopping at the traffic light to assist the driving of the driver, operation to provide notification of accelerator off timing and brake on timing with which it is possible to stop at a stop line with excellent energy efficiency and the like. The driving assistance controller 20e may also display the travel plan calculated by the travel plan calculating unit 20d on the car navigation device 28 and the display device 42 or output the same from the speaker 30.

Figure 3:
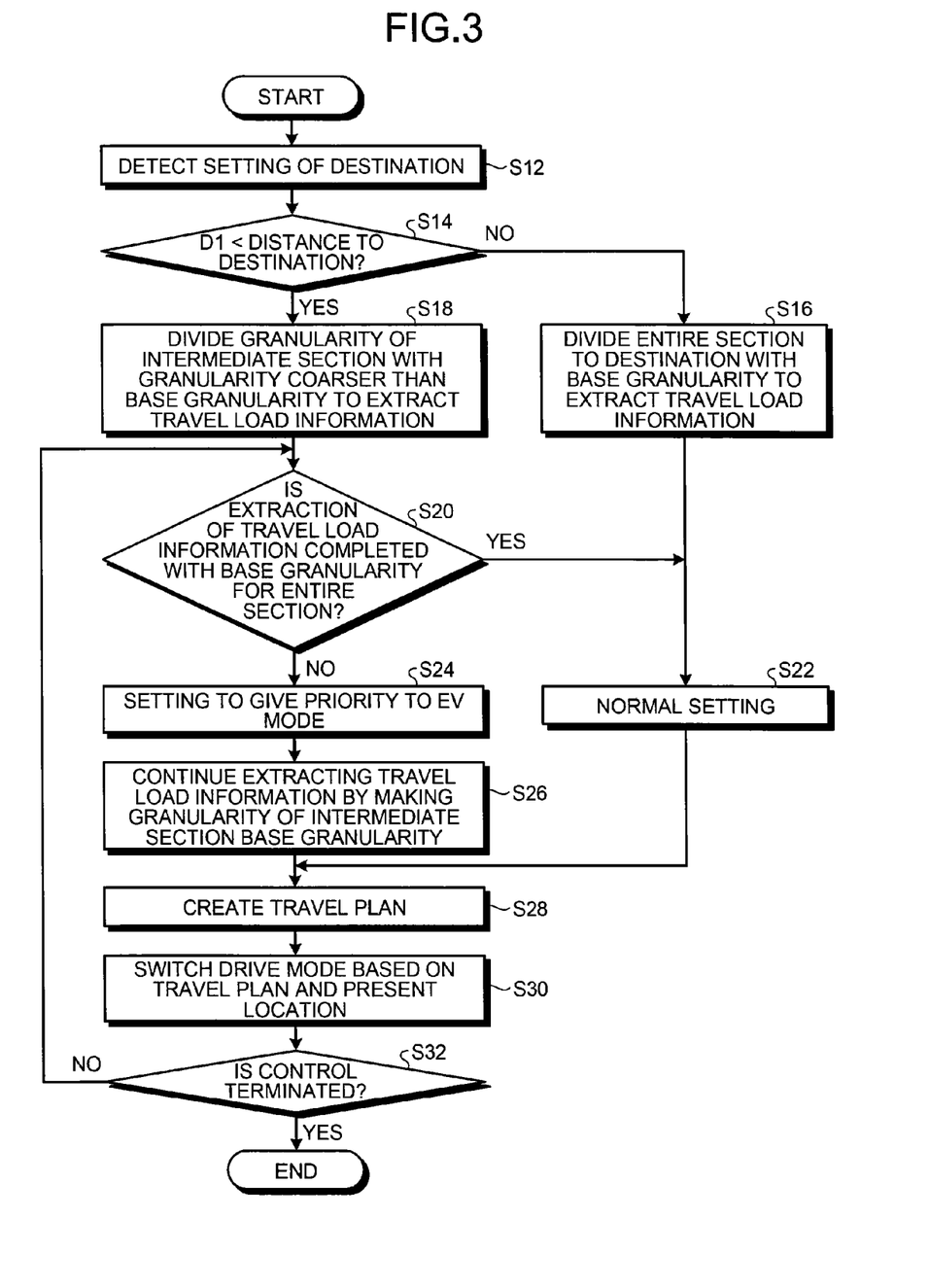
FIG. 3 is a flowchart of an example of a process of an ECU.
Figure 4:
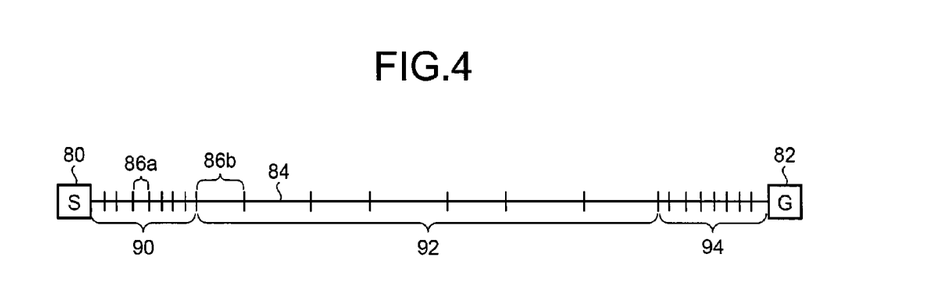
FIG. 4 is an explanatory diagram for explaining process operation of the vehicle control device.
Figure 5:
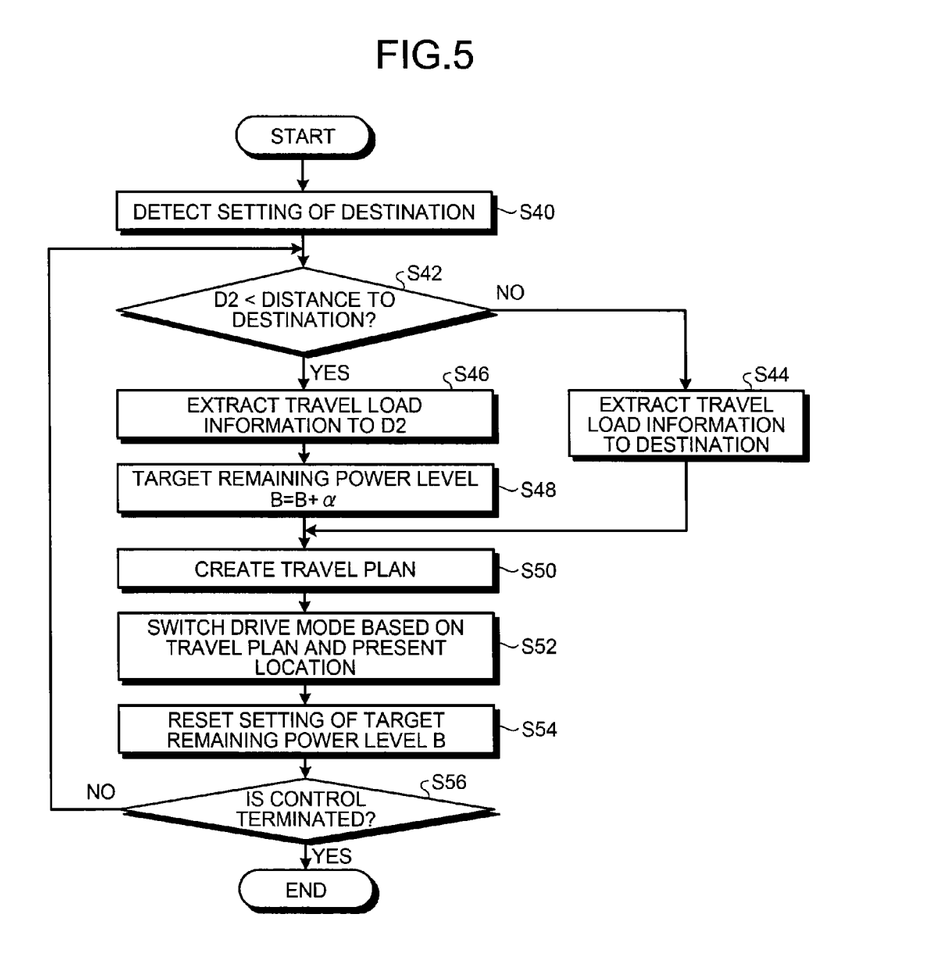
FIG. 5 is a flowchart of an example of the process of the ECU.

The control executed by the ECU 20 of the vehicle 10 is hereinafter described in more detail with reference to FIGS. 3 to 6. FIG. 3 is a flowchart of an example of the process of the ECU 20. FIG. 4 is an explanatory diagram for explaining process operation of the vehicle control device. FIG. 5 is a flowchart of an example of the process of the ECU 20. Meanwhile, the processes in FIGS. 3 and 5 are realized by execution of the process by the route detecting unit 20b, the travel load calculating unit 20c, and the travel plan calculating unit 20d being units forming the vehicle control device 19 out of the units of the ECU 20.

The ECU 20 detects setting of the destination at step S12. Herein, the setting of the destination is detected based on the information input to the car navigation device 28 and the like by the driver and the like. When the ECU 20 detects the setting of the destination at step S12, this determines whether D1<a distance to the destination is satisfied at step S14. Herein, D1 is a distance set as a threshold value. The distance D1 is the distance determined by the driver or an operator, or by the setting in advance. The ECU 20 determines whether the distance to the destination is longer than the distance D1 at step S14.

When the ECU 20 determines that D1<the distance to the destination is not satisfied (No), that is to say, the distance to the destination is not longer than D1 at step S14, this divides an entire section to the destination with base granularity to extract the travel load information at step S16. Herein, in this embodiment, the granularity is a criterion for dividing the route when extracting the travel load information. That is to say, the granularity is a value corresponding to a level of detail of the travel load information. The base granularity is criterial granularity. When the ECU 20 divides the entire section to the destination with the base granularity, this extracts the travel load information for each divided partition. Specifically, the ECU 20 extracts the information used for creating the travel load information for each partition obtained by division with the base granularity and creates the travel load information for each partition based on the extracted information. Herein, road (map) information for calculating the route and the road traffic information are used as the information used for creating the travel load information. When the ECU 20 extracts the travel load information at step S16, this shifts to step S22.

When the ECU 20 determines that D1<the distance to the destination is satisfied (Yes) at step S14, this divides granularity of an intermediate section with granularity coarser than the base granularity to extract the travel load information at step S18. Specifically, the ECU 20 determines a route 84 from a present location 80 to a destination 82 based on the present location (start position) 80 and the destination (goal position) 82 as illustrated in FIG. 4. Thereafter, when a distance of the route 84 is longer than D1, the ECU 20 divides the route 84 with a plurality of types of granularity 86a and 86b. The ECU 20 divides the route 84 into a section 90 on a side of the present location 80, an intermediate section 92, and a section 94 on a side of the destination 82. Meanwhile, the section 90 and the intermediate section 92, and the section 94 and the intermediate section 92 are divided based on the setting, respectively. For example, a position a certain distance from the present location 80 may be made a boundary between the section 90 and the intermediate section 92. A position a certain distance from the destination 82 may be made a boundary between the section 94 and the intermediate section 92.

The ECU 20 divides each of the sections 90 and 94 out of the three sections into a plurality of partitions with the granularity 86a. Herein, the granularity 86a is the base granularity. The ECU 20 divides the intermediate section 92 into a plurality of partitions with the granularity 86b. Herein, the granularity 86b is coarser than the granularity 86a. That is to say, the intermediate section 92 is divided into a plurality of partitions having a distance longer than that with the granularity 86a. According to this, the partition of the intermediate section 92 has the distance longer than that of the partition of the sections 90 and 94. In the above-described manner, the ECU 20 divides the intermediate section 92 into a plurality of partitions with the granularity coarser than the base granularity. The ECU 20 extracts the travel load information for each divided section. Specifically, the ECU 20 extracts the information used for creating the travel load information for each partition obtained by the division with each granularity and creates the travel load information for each partition based on the extracted information.

When the ECU 20 extracts the travel load information at step S18, this determines whether the extraction of the travel load information with the base granularity is completed for the entire section at step S20. The ECU 20 determines whether the granularity of each partition of the extracted travel load information is the base granularity in the entire section. When the ECU 20 determines that the extraction with the base granularity is completed (Yes) at step S20, this shifts to step S22. When the ECU 20 determines that the extraction with the base granularity is not completed (No) at step S20, the ECU 20 shifts to step S24.

When the ECU 20 executes the process at step S16 or when this determines Yes at step S20, this makes setting normal setting at step S22 and shifts to step S28. Herein, in the normal setting, setting of a criterion when determining the drive mode is made normal.

When the ECU 20 determines No at step S20, that is to say, when this determines that there is the travel load information of the partition divided with the granularity coarser than the base granularity, this sets to give priority to the EV mode at step S24. Herein, the setting to give priority to the EV mode is the setting in which the EV mode tends to be assigned at the time of determination of the drive mode of the travel plan. For example, this is the setting in which the EV mode is assigned to a part of the values of the travel load to which the hybrid mode is assigned in the normal mode.

When the ECU 20 sets to give priority to the EV mode at step S24, this continues extracting the travel load information with the base granularity as the granularity of the intermediate section at step S26. That is to say, this divides intermediate section in which the travel load information is extracted with the granularity coarser than the base granularity at step S18 again with the base granularity and executes extraction of the travel load information for the partition divided with the base granularity. The ECU 20 replaces the travel load information of the partition in which the travel load information is extracted with the base granularity for the intermediate section. When the ECU 20 performs the process at step S26, this shifts to step S28. That is to say, the ECU 20 continues the process illustrated in FIG. 3 while performing the process to replace the travel load information of the intermediate section until the travel load information is extracted with the base granularity for the entire section.

When the ECU 20 executes the process at step S22 or S26, this creates the travel plan at step S28. Specifically, the ECU 20 determines the drive mode when traveling in each section and each partition based on the extracted travel load information to the destination and the setting (setting to give priority to the EV mode and normal setting) and makes relationship between the determined drive mode and each section and each partition the travel plan.

When the ECU 20 creates the travel plan at step S28, this switches the drive mode based on the travel plan and the present location at step S30. Specifically, the ECU 20 determines the travel load of the present location based on the travel plan and the present location and switches the drive mode based on a result thereof. Meanwhile, the ECU 20 may specify the drive mode assigned by the travel plan based on the present location to drive in the drive mode or may correct the drive mode assigned by the travel plan based on the travel load of the present location.

When the ECU 20 switches the drive mode at step S30, this determines whether the control is terminated at step S32. The ECU 20 determines that the control is terminated when arriving at the destination, when the destination is changed, when the driving assistance is stopped and the like. When the ECU 20 determines that the control is not terminated (No) at step S32, the ECU 20 shifts to step S20. When the ECU 20 determines that the control is terminated (Yes) at step S32, this process is terminated. Meanwhile, when the travel load information is updated at step S26, the ECU 20 may calculate an entire travel plan, but this may also correct a necessary portion.

The vehicle control device 19 can calculate an appropriate travel plan in a short time by changing the level of detail of the section which is used for calculating the travel load information according to the distance to the destination (remaining distance to the destination) as illustrated in FIGS. 3 and 4. The vehicle control device 19 can rapidly start appropriate driving assistance by calculating the appropriate travel plan in a short time.

The vehicle control device 19 of this embodiment divides the entire section with the base granularity to extract the travel load information when the distance to the destination is not longer than a threshold distance (distance D1), and divides the intermediate section with the granularity coarser than the base granularity to extract the travel load information when the distance to the destination is longer than the threshold distance (distance D1). In this manner, the vehicle control device 19 can make an information amount of the travel load information to be determined not larger than a certain amount even when the distance to the destination is long by dividing the intermediate section with the granularity coarser than the base granularity to extract the travel load information when the distance to the destination is longer than the threshold distance (distance D1). The vehicle control device 19 can also extract the travel load information of the entire section by extracting the travel load information with coarser granularity, thereby maintaining accuracy while reducing necessary time for calculating the travel plan. The vehicle control device 19 can increase the information amount in the vicinity of the present location and in the vicinity of the destination by making the section in which the granularity is coarser the intermediate section, thereby maintaining the accuracy of the travel plan.

Although the vehicle control device 19 of this embodiment changes the level of detail by changing the granularity of the partition into which each section is divided, the device is not limited to this. The vehicle control device 19 is only required to adjust a data amount of various types of information used for calculating the travel load information and any but the granularity may also be used as the level of detail. For example, a type of the data to be used may be adjusted as the level of detail. It may be configured to calculate the travel load information by adding the distance of the route, the inclination, the traffic jam information, the information of the traffic light cycle, and behavior by the executed driving assistance in the section (or partition) in which the level of detail is high, and to calculate the travel load by adding only the distance of the route in the section (or partition) in which the level of detail is low.

When the vehicle control device 19 extracts the travel load information by making the granularity of the intermediate section the coarse granularity, this can improve the accuracy of the travel plan while rapidly starting the driving assistance based on the travel plan by continuing the process to extract the travel load information by making the granularity of the intermediate section the base granularity (that is to say, finer granularity), updating (rewriting) the travel load information of the route, and calculating again or correcting the travel plan even after the travel plan is calculated. According to this, both an effect obtained by starting the driving assistance in a shorter time and an effect obtained by executing the driving assistance with a higher degree of accuracy can be obtained. The vehicle control device 19 may also notify the driver that the calculation of the travel plan is competed and the driving assistance may be started as the driving assistance. Furthermore, when the travel plan is updated, the vehicle control device 19 may notify the driver of this. According to this, the driver can recognize the accuracy of the calculated travel plan.

When the travel load information cannot be extracted yet with the base granularity in the entire section, that is to say, when the granularity of the travel load information in the intermediate section is coarse, the vehicle control device 19 can make difference between the travel plan before update and the travel plan after the update smaller by calculating the travel plan by setting such that the EV mode is preferentially selected as the drive mode. According to this, it is possible to reduce possibility that change in the travel plan gives the driver a feeling of strangeness when the driver is notified of the travel plan.

Although a case in which the vehicle control device 19 of this embodiment sets the drive mode of each section and each partition as the travel plan is described, the device is not limited thereto. It is also possible to determine an engine operation ratio of each section and each partition, determine an engine threshold value (threshold value of the travel load as a condition of traveling in the hybrid mode at the time of the travel), or set a target SOC as the travel plan. If the vehicle travels so as to realize the value of the travel plan, the engine threshold value, and the target SOC based on the travel plan and a condition at the time of actual travel, it is possible to further improve fuel economy and assist such that the driver drives comfortably. When the vehicle control device 19 determines the engine threshold value (threshold value of the travel load as the condition of the hybrid travel at the time of the travel) as the travel plan, this starts traveling in the hybrid mode when the travel load exceeds the engine threshold value of the section or partition in which this travels during the travel in the EV mode. The vehicle control device 19 can control tendency of the travel in the hybrid mode in each section and each partition by adjusting the engine threshold value being the condition of traveling in the hybrid mode at the time of the travel, thereby improving the fuel economy.

Meanwhile, although the vehicle control device 19 makes the granularity of the intermediate section the coarse granularity in order to reduce an effect on the travel plan, the device is not limited to this. The vehicle control device 19 may calculate the entire route to the destination with the coarse granularity when the distance to the destination is longer than the distance D1.

Herein, it is preferable that the vehicle control device 19 adjusts an area in which the travel plan is calculated when the distance to the destination is longer than a threshold value of a distance longer than the above-described distance D1. An example of the process of the ECU 20 of the vehicle control device 19 is described with reference to FIG. 5. The ECU 20 detects the setting of the destination at step S40. When the ECU 20 detects the setting of the destination at step S40, this determines whether D2<the distance to the destination is satisfied at step S42. Herein, D2 is a distance set as the threshold value longer than the above-described distance D1. The ECU 20 determines whether the distance to the destination is longer than the distance D2 at step S42.

When the ECU 20 determines that D2<the distance to the destination is not satisfied (No), that is to say, the distance to the destination is not longer than D2 at step S42, this extracts the travel load information to the destination at step S44. Herein, the extracting process of the travel load information executed at step S44 is the process of the flowchart in FIG. 3. That is to say, the ECU 20 adjusts the granularity with which the travel load information is calculated based on the distance to the destination to extract the travel load information. When the travel load information is calculated with the coarse granularity, this continues extracting the travel load information with finer granularity to update. This also switches the setting to determine the drive mode. When the ECU 20 extracts the travel load information at step S44, the ECU 20 shifts to step S50.

When the ECU 20 determines that D2<the distance to the destination is satisfied (Yes) at step S42, this extracts the travel load information to the distance D2 at step S46. Meanwhile, in this case, it is preferable that the ECU 20 detects the travel load information of the section to the distance D2 with the coarse granularity and thereafter continues extracting the travel load information with the base granularity. Meanwhile, the ECU 20 may also extract the travel load information with the base granularity from the beginning.

When the ECU 20 extracts the travel load information at step S46, this sets a target remaining power level (target SOC) B to B+α, that is to say, sets B=B+α at step S48 and shifts to step S50. That is to say, the ECU 20 sets SOC a higher value.

When the ECU 20 executes the process at step 44 or S48, this creates the travel plan at step S50. Specifically, the ECU 20 determines the drive mode when traveling in each section and each partition based on the extracted travel load information to the destination or travel load information to the distance D2 and the setting (setting to give priority to the EV mode and normal setting) and makes the relationship between the determined drive mode and each section and each partition the travel plan.

When the ECU 20 creates the travel plan at step S50, this switches the drive mode based on the travel plan and the present location at step S52. Specifically, the ECU 20 determines the travel load of the present location based on the travel plan and the present location and switches the drive mode based on a result thereof. Meanwhile, the ECU 20 may specify the drive mode assigned by the travel plan based on the present location to drive in the drive mode or correct the drive mode assigned by the travel plan based on the travel load of the present location.

When the ECU 20 switches the drive mode at step S52, this resets the setting of the target remaining power level B, that is to say, returns the same to a criterion value at step S54 and determines whether the control is terminated at step S56. The ECU 20 determines that the control is terminated when arriving at the destination, when the destination is changed, when the driving assistance is stopped and the like. When the ECU 20 determines that the control is not terminated (No) at step S56, the ECU 20 shifts to step S42. When the ECU 20 determines that the control is terminated (Yes) at step S56, this process is terminated.

The vehicle control device 19 may rapidly calculate the travel plan and execute the appropriate driving assistance by determining an area of a target the travel plan of which is calculated according to the distance to the destination (remaining distance to the destination) as illustrated in FIG. 5. That is to say, when the distance to the destination is long, it is possible to rapidly calculate the travel plan by calculating the travel plan of a predetermined distance.

The vehicle control device 19 creates the travel plan to the destination when the distance to the destination is shorter than the threshold distance (D2) and creates the travel plan of the route to the distance D2 when the distance to the destination is not shorter than the threshold distance (D2). According to this, it is possible to decrease an error in the travel plan and create a higher-accuracy travel plan. Since the accuracy of the travel plan becomes high, it becomes possible to travel by using the drive force of the vehicle 10 at a preferable ratio, thereby improving the fuel economy.

When the vehicle control device 19 creates the travel plan with the travel load information to an intermediate point on the route to the destination, this may ensure a section in which the travel in the EV mode is possible in the point to the distance D2 even when the travel plan to the intermediate point to the destination is created by correcting the target SOC to a higher value (value with which a remaining amount of the battery becomes larger), thereby preventing inhibition of a fuel economy improving effect. Meanwhile, although the target SOC is adjusted in the above-described embodiment, there is no limitation, and it may be set such that the hybrid mode is preferentially selected as the drive mode or set such that an operation threshold value of the engine is decreased. When the vehicle control device 19 creates the travel plan with the travel load information to the intermediate point on the route to the destination, it may set such that the remaining amount of the battery is made larger at the time of arrival at the distance D2.

Meanwhile, although the vehicle control device 19 calculates the travel load information by adjusting the granularity at steps S44 and S46 in the flowchart in FIG. 5, the device is not limited to this. The vehicle control device 19 may make the granularity constant when executing the process of the flowchart in FIG. 5. In this case also, it is possible to adjust the level of detail of the travel load information of the route to the destination by adjusting the section in which the travel load information is extracted on the route to the destination. That is to say, the vehicle control device 19 can adjust the level of detail of the travel load information by controlling whether to extract the travel load information to the intermediate point or to extract the travel load information to the destination even when the length of the partition and the type of the information to be used are made constant.

The vehicle control device 19 may also calculate the travel plan to a position which becomes clear in the process illustrated in FIG. 5 when the destination is not clear.

Although the vehicle control device 19 is described such that the processes illustrated in FIGS. 3 and 5 are executed after the destination is set, the device is not limited to this. The vehicle control device 19 may create the travel plan again also after the destination is set. That is to say, the vehicle control device 19 may create the travel plan again when a predetermined condition (for example, for each travel of a certain distance or after certain time elapses) is satisfied after the destination is set. According to this, it is possible to update each information to a newest state to appropriately correct the travel plan and further improve the fuel economy.

Figure 6:
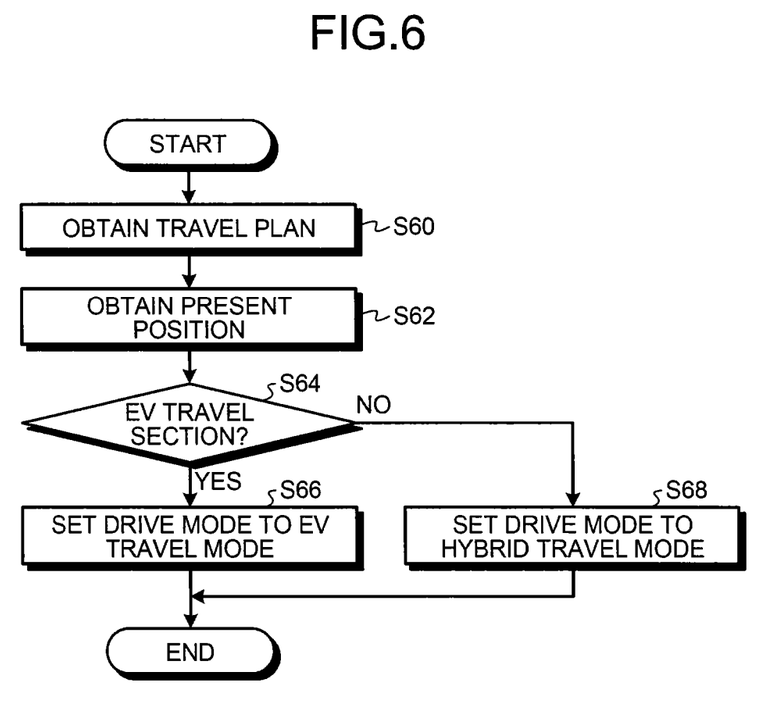
FIG. 6 is a flowchart of an example of the process of the ECU.

Next, an example of the process of the driving assistance using the travel plan is described with reference to FIG. 6. FIG. 6 is a flowchart of an example of the process of the ECU. The ECU 20 repeatedly executes the process illustrated in FIG. 6 at the time of the travel. The ECU 20 obtains the travel plan at step S60. Meanwhile, the plan obtained in advance may be used as the travel plan. When the ECU 20 obtains the travel plan at step S60, this obtains the present location at step S62. Meanwhile, the information of the present location can be obtained from the GPS communicating unit 32.

When the ECU 20 obtains the present location at step S62, this determines whether it is in an EV travel section at step S64. The ECU 20 compares the travel plan obtained at step S60 with the present location obtained at step S62 and determines whether the drive mode of the travel plan of the present location is the EV travel mode. When the ECU 20 determines that it is in the EV travel section (Yes) at step S64, this sets the drive mode to the EV travel mode at step S66 and this process is terminated. When the ECU 20 determines that it is not in the EV travel section (No) at step S64, this sets the drive mode to the hybrid travel mode at step S68 and this process is terminated.

The vehicle 10 may efficiently use the drive force of the power source by switching the drive mode based on the travel plan created by the vehicle control device 19 in this manner, thereby improving the fuel economy. For example, when the vehicle 10 is a plug-in hybrid vehicle, it is possible to use more electric power charged into the battery before this arrives at a position at which this is recharged. According to this, it becomes possible to efficiently consume the electric power, thereby improving the fuel economy.

The driving control system 1 of the above-described embodiment may efficiently obtain the road information of a wider area by obtaining the road traffic information by the communication with the traffic information communication base station (ITS spot) 15. Although the vehicle 10 of the driving control system 1 of the above-described embodiment obtains the road traffic information by the communication with the traffic information communication base station 15, the vehicle is not limited to this. The vehicle 10 may also receive an electric wave output by various types of wireless communication, for example, by a radio wave and a television wave to obtain the road traffic information included in the electric wave.

The travel load calculating unit 20c may also calculate the travel load by adding the information of the driving assistance executed by the driving assistance controller 20e at the time of the travel. For example, it is also possible to calculate the travel load information by adding execution of assistance to improve the fuel economy executed by the driving assistance controller 20e at the time of the travel, for example, the assistance to guide the vehicle speed at which it is possible to pass the blue light and the assistance to guide accelerator off timing such that it is possible to travel by free running when stopping at the red light. According to this, the vehicle control device 19 can calculate a more accurate travel load, thereby creating a more appropriate driving plan. According to this, the vehicle control device 19 can further improve the fuel economy to assist such that the driver may drive comfortably. In this case also, the vehicle control device 19 can provide the required information and calculation result in a short time by adjusting the level of detail (granularity) with which the travel load information is calculated based on the distance to the destination.

REFERENCE SIGNS LIST

1 DRIVING CONTROL SYSTEM
10 VEHICLE
12, 12A TRAFFIC LIGHT
14 INFRASTRUCTURE INFORMATION TRANSMITTING DEVICE
15 TRAFFIC INFORMATION COMMUNICATION BASE STATION
16 GPS SATELLITE

19 VEHICLE CONTROL DEVICE
20 ECU
20A DRIVE CONTROLLER
20B ROUTE DETECTING UNIT
20C TRAVEL LOAD CALCULATING UNIT
20D TRAVEL PLAN CALCULATING UNIT
20E DRIVING ASSISTANCE CONTROLLER
22 STORAGE UNIT
24 ACCELERATOR ACTUATOR
25A ENGINE
25B MG (MOTOR GENERATOR)
26 BRAKE ACTUATOR
28 CAR NAVIGATION DEVICE
30 SPEAKER
32 GPS COMMUNICATING UNIT
38 INFRASTRUCTURE COMMUNICATING UNIT
40 VEHICLE SPEED SENSOR
42 DISPLAY DEVICE
44 HYBRID ECU
46 BATTERY ACTUATOR

The invention claimed is:

1. A vehicle control device that controls a vehicle, comprising:
a route detecting unit configured to detect a route to a destination;
a travel load calculating unit configured to calculate travel load information of the route; and
a travel plan calculating unit configured to calculate a travel plan including a drive mode of each section of the route based on the route and the travel load information of the route, wherein
the travel load calculating unit changes a level of detail of the section which is used for calculating the travel load information according to a distance from a present location to the destination,
at the time the distance from the present location to the destination is longer than a threshold distance, the travel load calculating unit calculates the travel load information of at least a partial section with a level of detail coarser than the level of detail in a case where the distance from the present location to the destination is shorter than the threshold distance, and
at the time the distance from the present location to the destination is longer than the threshold distance, the travel load calculating unit makes a level of detail of an intermediate section coarser than a level of detail of a section in the vicinity of the present location and in the vicinity of the destination.

2. The vehicle control device according to claim 1, wherein
at the time the distance from the present location to the destination is longer than the threshold distance, the travel load calculating unit calculates the travel load information of at least a partial section with the level of detail coarser than the level of detail in a case where the distance from the present location to the destination is shorter than the threshold distance,
the travel load calculating unit then calculates the travel load information of the at least partial section with a finer level of detail, and
at the time the travel load information is updated, the travel plan calculating unit updates the travel plan based on the updated travel load information.

3. The vehicle control device according to claim 2, further comprising:
a travel assistance unit configured to notify a driver of the travel plan calculated by the travel plan calculating unit.

4. The vehicle control device according to claim 2, wherein
the vehicle is a hybrid vehicle provided with a motor generator and an internal-combustion engine, and
the travel plan calculating unit is capable of selecting, as the drive mode, an EV mode to travel by using the motor generator as a drive source and a hybrid travel mode to travel by using the motor generator and the internal-combustion engine as drive sources.

5. The vehicle control device according to claim 2, wherein
at the time the distance from the present location to the destination is longer than a set distance, the travel load calculating unit calculates the travel load information to an intermediate point on the route to the destination.

6. The vehicle control device according to claim 2, wherein
at the time the level of detail is coarse, the travel load calculating unit makes a distance of the section longer than a distance in a case where the level of detail is fine.

7. The vehicle control device according to claim 1, further comprising:
a travel assistance unit configured to notify a driver of the travel plan calculated by the travel plan calculating unit.

8. The vehicle control device according to claim 7, wherein
the vehicle is a hybrid vehicle provided with a motor generator and an internal-combustion engine, and
the travel plan calculating unit is capable of selecting, as the drive mode, an EV mode to travel by using the motor generator as a drive source and a hybrid travel mode to travel by using the motor generator and the internal-combustion engine as drive sources.

9. The vehicle control device according to claim 7, wherein
at the time the distance from the present location to the destination is longer than a set distance, the travel load calculating unit calculates the travel load information to an intermediate point on the route to the destination.

10. The vehicle control device according to claim 7, wherein
at the time the level of detail is coarse, the travel load calculating unit makes a distance of the section longer than a distance in a case where the level of detail is fine.

11. The vehicle control device according to claim 1, wherein
the vehicle is a hybrid vehicle provided with a motor generator and an internal-combustion engine, and
the travel plan calculating unit is capable of selecting, as the drive mode, an EV mode to travel by using the motor generator as a drive source and a hybrid travel mode to travel by using the motor generator and the internal-combustion engine as drive sources.

12. The vehicle control device according to claim 11, wherein
the travel plan calculating unit calculates the travel plan with a condition in which the EV mode tends to be selected, at the time the travel load information with the level of detail coarser than the level of detail in a case where the distance from the present location to the destination is shorter than the threshold distance is included.

13. The vehicle control device according to claim 12, wherein
at the time the distance from the present location to the destination is longer than a set distance, the travel load calculating unit calculates the travel load information to an intermediate point on the route to the destination.

14. The vehicle control device according to claim 12, wherein
at the time the level of detail is coarse, the travel load calculating unit makes a distance of the section longer than a distance in a case where the level of detail is fine.

15. The vehicle control device according to claim 11, wherein
at the time the distance from the present location to the destination is longer than a set distance, the travel load calculating unit calculates the travel load information to an intermediate point on the route to the destination.

16. The vehicle control device according to claim 11, wherein
at the time the level of detail is coarse, the travel load calculating unit makes a distance of the section longer than a distance in a case where the level of detail is fine.

17. The vehicle control device according to claim 1, wherein
at the time the distance from the present location to the destination is longer than a set distance, the travel load calculating unit calculates the travel load information to an intermediate point on the route to the destination.

18. The vehicle control device according to claim 17, wherein
the vehicle is the hybrid vehicle provided with the motor generator and the internal-combustion engine, the travel plan calculating unit is capable of selecting, as the drive mode, the EV mode to travel by using the motor generator as the drive source and the hybrid travel mode to travel by using the motor generator and the internal-combustion engine as the drive sources, and
at the time the section in which the travel load information is calculated is to the intermediate point on the route to the destination, a target SOC at the time of arrival at the intermediate point is set to a high value.

19. The vehicle control device according to claim 17, wherein
at the time the level of detail is coarse, the travel load calculating unit makes a distance of the section longer than a distance in a case where the level of detail is fine.

20. The vehicle control device according to claim 1, wherein
at the time the level of detail is coarse, the travel load calculating unit makes a distance of the section longer than a distance in a case where the level of detail is fine.

\* \* \* \* \*